Feb. 6, 1940.   J. L. MORRIS   2,189,350
PIPE COUPLING
Filed Nov. 13, 1937
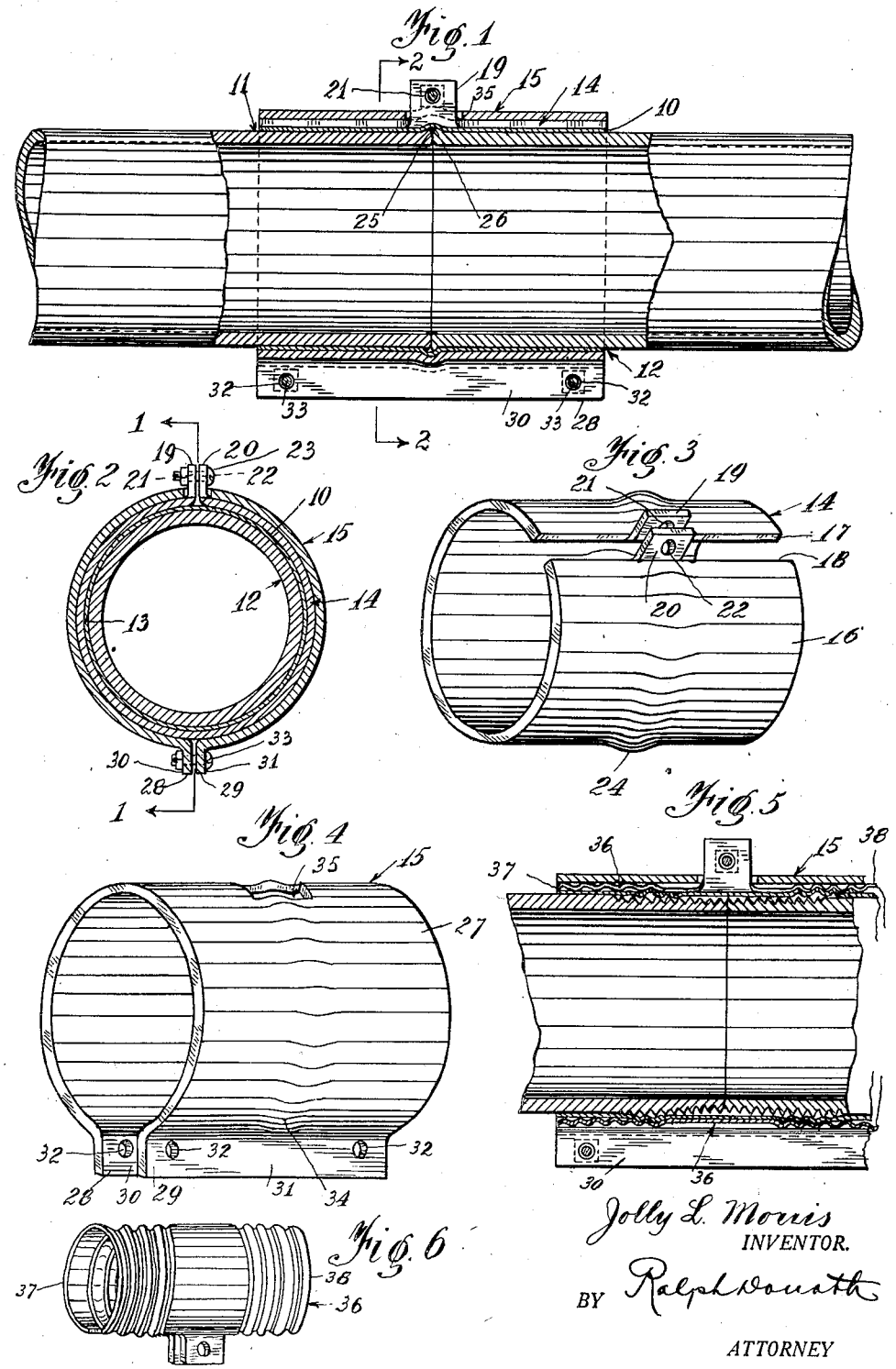
Jolly L. Morris
INVENTOR.
BY Ralph Donath
ATTORNEY Patented Feb. 6, 1940

2,189,350

UNITED STATES PATENT OFFICE 2,189,350

PIPE COUPLING

Jolly L. Morris, Houston, Pa., assignor, by direct and mesne assignments, of three-fourths to Frank W. Finley, Pittsburgh, Pa.

Application November 13, 1937, Serial No. 174,348

4 Claims. (Cl. 285—194)

This invention relates to connectors for uniting the adjacent ends of length of pipes or tubes and one of the objects of this invention is to provide a connector which shall give a fluid tight and leak-proof connection.

Another object of the invention is to provide a connector which will eliminate so-called collar-leak-clamps and unions.

Yet another object of the invention is to provide a coupling which will tend to resist unscrewing of the threaded connection at the joint and maintain a fluid tight joint.

Still another object of the invention is to provide a coupling in which the adjacent ends of pipe lengths are in abutment, thereby providing an uninterrupted flow of the liquid in the pipe line.

Another object of the invention is to provide a coupling which can be applied to existing pipe lines when replacing pipe lengths without the use of unions.

With these and other objects in view the invention will be better understood from the following detailed description taken in connection with the accompanying drawing wherein:

Figure 1 is a central longitudinal section along line 1—1 in Figure 2 through a coupling assembly using plain pipe ends and embodying the invention, part of the pipe being in outline.

Figure 2 is a sectional view along line 2—2 in Figure 1.

Figure 3 is an isometric view of the inner sleeve clamp as used in Figures 1 and 2.

Figure 4 is an isometric view of the outer sleeve clamp as used in Figures 1 and 2.

Figures 5 shows a modification of Figure 1 showing a central longitudinal section through a coupling assembly using threaded pipe ends.

Figure 6 is an isometric view of the corrugated inner sleeve of the coupling as used in Figure 5.

In carrying out my invention as illustrated in Figures 1 to 4 inclusive, I employ a gasket 10 of any suitable material, but preferably of a packing element such as sheet lead, which is wrapped around the abutting unthreaded pipe ends 11 and 12 forming an overlapped joint at 13 (Figure 2). The said gasket 10 is pressed against the exterior of said adjacent pipe ends 11 and 12 by means of an inner sleeve clamp 14 and an outer sleeve clamp 15, both of which serve to evenly exert pressure around the outer pipe surface near the joint.

Figure 3 illustrates the above mentioned inner sleeve clamp 14, and the same consists of an open elongated cylindrical sleeve 16 of resilient sheet metal, the open edges 17 and 18 of which having about midway radially and outwardly projecting lugs 19 and 20 preferably formed integrally with said sleeve 16, as shown, and provided with oppositely located apertures 21 and 22 adapted to receive a clamping screw or bolt 23.

Midway of the ends of said sleeve 16 is a circular, outwardly bulging rounded groove 24 adapted to receive, when in assembled condition, the usually upturned edges 25 and 26 of the pipe ends 11 and 12 respectively; as is well known, these upturned edges are caused by the cutting wheels of the cutting tool. Of course, when standard lengths of pipe are used these upturned edges do not exist.

Figure 4 illustrates the outer sleeve 15 which is similarly constructed as the heretofore described inner sleeve clamp 14.

The same comprises an open elongated cylindrical sleeve 27 of sheet material, preferably steel, the open ends 28 and 29 of which are bent radially and outwardly to form opposing flanges 30 and 31 respectively. These flanges extend to the full length of said sleeve 27 and the interior diameter of the latter corresponds to approximately the same dimension as is the outside diameter of the inner sleeve clamp 14. The said opposing flanges 30 and 31 at their adjacent ends have apertures 32 to receive clamping screws or bolts 33.

Midway of the ends of said sleeve 27 is a circumferential outwardly extending groove 34 sufficiently large to fit loosely around the groove 24 of the inner sleeve clamp 14. Directly opposite said flanges 30 and 31 of outer sleeve clamp 15 is a square aperture 35, large enough to freely accommodate the lugs 19 and 20 of clamp 14.

To use the pipe connector, the inner sleeve clamp 14 may be inserted into the outer sleeve clamp 15 by spreading the latter slightly apart sufficiently ample to permit the lugs 19 and 20 of clamp 14 to be introduced into the square aperture 35. In that condition the sleeves are slid over either of the pipe ends 11 or 12, the packing element or gasket 10 is then wrapped around the abutting pipe ends and the clamps slid over the gasket. The clamping screw 23 of lugs 19 and 20 of inner clamp 14 is now tightened, and the clamp will snugly contact the gasket 10 against the exterior surface of the pipe ends 11 and 12.

In order to avoid the possibility of leaking especially in the vicinity of the open end of the clamp 14 the outer clamp is now tightened by means of the screws 33. Having two interposed clamps in an arrangement as shown, the pressure applied to the gasket and therefore against the pipe ends

11 and 12 is thus equalized and a liquid tight joint will thus be provided at the joint.

In the modification as shown in Figures 5 and 6, the coupling is applied to pipe ends which are threaded instead of plain as in the embodiment heretofore described.

In the aforesaid embodiment, all parts are substantially the same except the inner sleeve clamp 36 shown in Figure 6. This clamp 36 is substantially the same as the clamp 14 previously described except that the ends 37 and 38 are provided with circular corrugations, as shown, or the latter may be substituted by longitudinal corrugations (not shown) to afford ready gripping along the abutting ends of a threaded pipe.

While I have illustrated and described my invention, I do not desire to be limited to the structural details so illustrated and described; but intend to cover all forms and arrangements which fall within the terms employed in the definitions of my invention constituting the appended claims.

I claim:

1. In a pipe coupling of the kind described, comprising an inner clamping member nested within an outer clamping member, said inner clamping member adapted to frictionally engage a packing surrounding adjacent pipe ends of a pipe line, said outer clamping member adapted to frictionally engage said inner clamping member and independent means for tightening each of said clamping members to said pipe ends to form a liquid seal therewith.

2. In a pipe coupling of the kind described, comprising an inner clamping member nested within an outer clamping member, said inner clamping member adapted to frictionally engage a packing surrounding adjacent pipe ends of a pipe line, said outer clamping member in frictional engagement with said inner clamping member and independent means for tightening each of said clamping members to said pipe ends, said means situated in opposite direction.

3. In a pipe coupling of the kind described, comprising an inner cylindrical clamping member adapted to frictionally engage a packing surrounding adjacent pipe ends of a pipe line, an outer cylindrical clamping member adapted to frictionally engage said inner clamping member and individual tightening means for each of said clamping members.

4. In a pipe coupling of the kind described, comprising an inner cylindrical clamping member nested within an outer cylindrical clamping member, said inner clamping member adapted to frictionally engage with a packing surrounding adjacent pipe ends of a pipe line, said outer clamping member in frictional engagement with said inner clamping member, individual means to tighten said inner clamping member around said packing and individual means to tighten said outer clamping member around said inner clamping member.

JOLLY L. MORRIS.